United States Patent [19]

Fujita

[11] Patent Number: 4,834,510

[45] Date of Patent: May 30, 1989

[54] METHOD FOR DRIVING A FERROELECTRIC LIQUID CRYSTAL OPTICAL APPARATUS USING SUPERPOSED DC AND AC DRIVING PULSES TO ATTAIN INTERMEDIATE TONES

[75] Inventor: Masanori Fujita, Tokyo, Japan

[73] Assignee: Seikosha Co., Ltd., Tokyo, Japan

[21] Appl. No.: 192,589

[22] Filed: May 9, 1988

[30] Foreign Application Priority Data

May 8, 1987 [JP] Japan ................................ 62-112935
May 13, 1987 [JP] Japan ................................ 62-116286
Jun. 1, 1987 [JP] Japan ................................ 62-138002

[51] Int. Cl.⁴ ................................................ G02F 1/13

[52] U.S. Cl. ................................ 350/350 S; 350/333; 340/784; 340/805

[58] Field of Search .................... 350/332, 333, 350 S; 340/765, 784, 805

[56] References Cited

U.S. PATENT DOCUMENTS

| | | | |
|---|---|---|---|
| 4,701,026 | 10/1987 | Yazaki et al. | 350/350 S X |
| 4,715,688 | 12/1987 | Harada et al. | 350/350 S |
| 4,725,129 | 2/1988 | Kondo et al. | 350/350 S |
| 4,762,400 | 8/1988 | Shimoda et al. | 350/350 S |
| 4,765,720 | 8/1988 | Toyono et al. | 350/350 S |
| 4,770,502 | 9/1988 | Kitazima et al. | 350/350 S |
| 4,773,738 | 9/1988 | Hayakawa et al. | 350/350 S |
| 4,776,676 | 10/1988 | Inoue et al. | 350/350 S |

*Primary Examiner*—Stanley D. Miller
*Assistant Examiner*—Richard Gallivan
*Attorney, Agent, or Firm*—Bruce L. Adams; Van C. Wilks

[57] ABSTRACT

The present invention realizes display of the intermediate tone by shortening the selection period of the one scanning line and setting a mean voltage level applied to the pixels to 0 by selectively applying the pulse, to the pixels, for initializing the ferroelectric liquid crystal to the saturated reverse response condition and the pulse superposing the high frequency AC pulse to the pulse having a mean voltage of 0 for such pulse and then applying the AC pulse which holds the response condition of ferroelectric liquid crystal while such pulse group is not applied to the pixels, and moreover by controlling a voltage value or duty (rate of the period for applying high frequency AC pulse and the period for not applying the pulse) of the high frequency AC pulse to be superposed to such pulse depending on the display tone.

8 Claims, 9 Drawing Sheets

METHOD FOR DRIVING A FERROELECTRIC LIQUID CRYSTAL OPTICAL APPARATUS USING SUPERPOSED DC AND AC DRIVING PULSES TO ATTAIN INTERMEDIATE TONES

[INDUSTRIAL APPLICABILITY]

The present invention relates to a method of driving a liquid crystal optical apparatus comprising ferroelectric liquid crystal.

BACKGROUND OF THE INVENTION AND PRIOR ART

Recently, the ferroelectric liquid crystal is watched with attention, in place of a TN type liquid crystal and a display apparatus utilizing it is now under development.

The display mode of ferroelectric liquid crystal includes the complex refraction type display mode and guest host type display mode. On the occasion of driving these display modes, unlike the conventional TN type liquid crystal, the driving method which has been used for the TN type liquid crystal cannot be employed because the display condition (contrast) is controlled depending on the direction of applying electric field and therefore a special driving method is required.

Moreover, when the service life of display apparatus is considered, it is not desirable that the DC element is applied for a long period to the display element and accordingly the driving method considering it is necessary.

A driving method not allowing application of such DC element to the display element for a long period is disclosed in the "SID' 85 Digest" (1985) (P. 131-P. 134). Moreover, the Japanese Laid-Open Patent No. 60-176097 discloses a method for driving display apparatus which realizes bistability of display with a driving electrical signal utilizing the ferroelectric liquid crystal having the AC stabilizing effect.

SUMMARY OF THE INVENTION

However, either driving method conceives such a serious disadvantage that stable display of intermediate tone is impossible.

The latter driving method also has a problem that the transparent electrodes for display are reduced and blackened, the dichroism pigment is discolored and liquid crystal is deteriorated because the DC element is sometimes applied to the pixels for a long period of time. Meanwhile, the former driving method can be free from a problem of deterioration of liquid crystal but results in a problem, when the period required for writing a pixel is t, that the period T required for rewriting a display format is expressed as $T=4\times t\times N$ (N is the number of scanning lines/format) and thereby the rewriting period T becomes longer and accordingly it is undesirable for display of dynamic picture.

It is therefore a first object of the present invention to stably realize the display of intermediate tone.

It is a second object of the present invention to provide a driving method which does not result in blackening of transparent electrode, discoloration of dichroism pigment and deterioration of liquid crystal even after the driving for a long period of time.

It is a third object of the present invention to realize a dynamic picture display by shortening the rewriting period of single display format and to realize increase of the scanning line numbers in the same rewriting period.

DETAILED DESCRIPTION OF THE PREFERRED EMBODIMENTS

Figure 1:
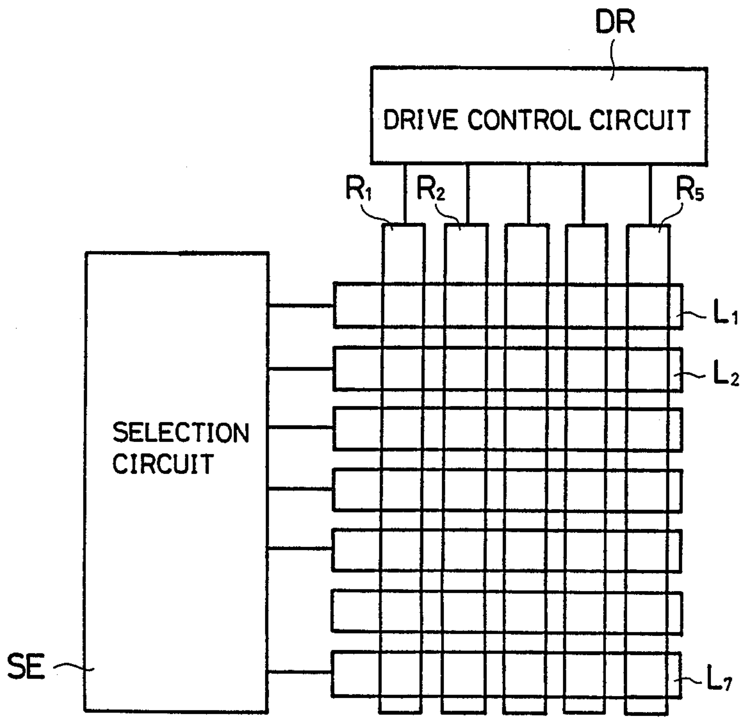
FIG. 1 shows an example of a display apparatus.
Figure 2:
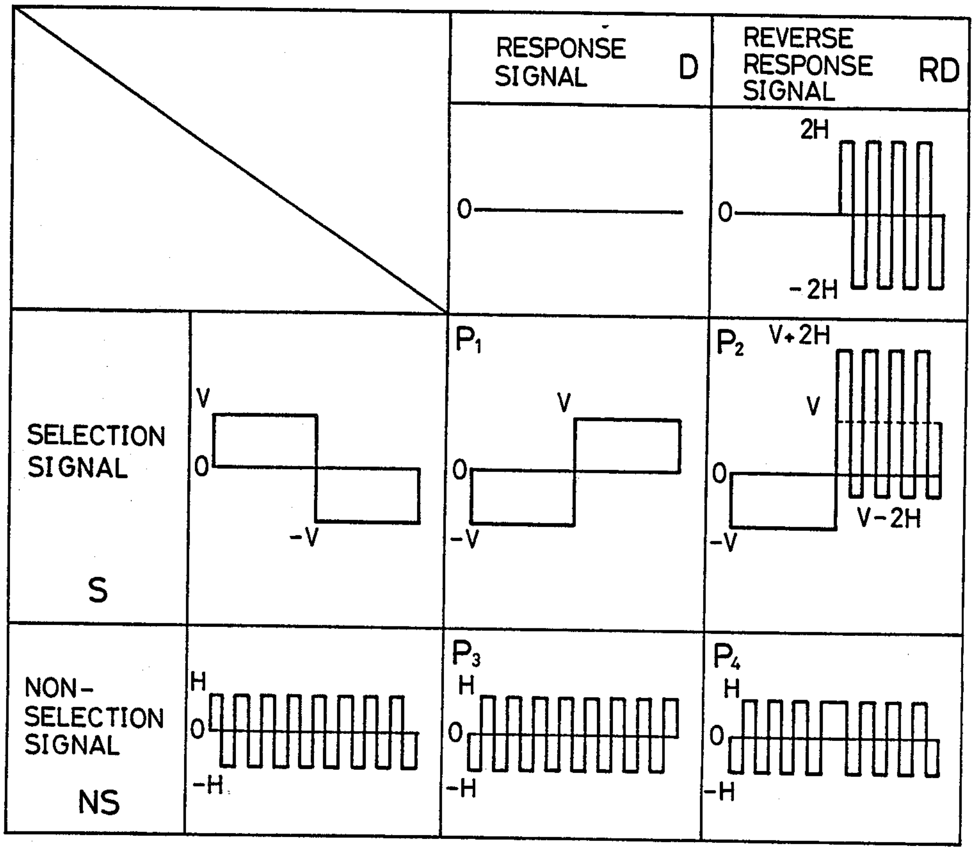
FIG. 2 and FIG. 3 show voltage waveforms for realizing the present invention.

In FIG. 1 and FIG. 2, selection signal S (FIG. 2) which sequentially selects, on the time sharing basis, scanning electrode groups L1~L7 is generated from the selection circuit SE and nonselection signal NS is generated while such selection signal is not supplied.

The selection signal S is composed of voltages +V and the nonselection signal NS is formed by voltages +H.

Meanwhile, drive control circuit DR generates the response signal D or reverse response signal RD shown in FIG. 2 and supplies these signals to the control electrode groups $R_1 \sim R_5$. Namely, the response signal D is supplied to the control electrode to be the response display and the reverse response signal RD to the control electrode to be the reverse response display.

With the supply of these signals, the pulse group $P_1$ is applied to the response pixels and the pulse group $P_2$ to the reverse response pixels. In the case of pulse group $P_1$, the liquid crystal is once initialized to the saturated reverse response condition by the DC pulse of the voltage $-V$ and is then initialized to the saturated response condition by the supply of DC pulse of the voltage V. On the other hand, in the case of pulse group $P_2$, the liquid crystal is once initialized to the saturated reverse response condition by the DC pulse of the voltage $-V$ and is not initialized to the saturated response condition owing to the AC stabilizing effect of the high frequency AC pulse but is kept at the saturated reverse response condition because the pulse superposing the high frequency AC pulse of voltages $\pm 2H$ to the voltage V is supplied.

After application of such pulse group $P_1$ or $P_2$, the high frequency AC pulse group $P_3$ or $P_4$ is applied by the nonselection signal NS and the response condition is held by the AC stabilizing effect. Here, the pulse groups $P_1$, $P_3$, $P_4$ are respectively composed of the AC pulses in the same waveform and number but different in the polarities and the pulse group $P_2$ has the mean voltage level 0 to be supplied to the pixels. Therefore, blackening of transparent electrodes, deterioration of liquid crystal and discoloration of dichroism pigment are no longer generated.

Moreover, since each line can be scanned within a short period of time (the selection signal is applied within a short period of time) and the writings for response and reverse response are carried out simultaneously in the same line, the rewriting period of single display format can be curtailed.

Pulse width and pulse amplitude H of response pulse $P_1$ are adequately determined to obtain the saturated reverse response condition and saturated response condition in relation to magnitude of self-generating polarization of ferroelectric liquid crystal and display cell thickness.

Moreover, the frequency of high frequency AC pulse should desirably be double or more (most preferably, an integer in 4 times or more) than the frequency of the response pulse $P_1$ and the pulse amplitude H is determined to stably hold the response condition in relation to the magnitude of dielectric anisotropy of the ferroelectric liquid crystal.

Figure 3:
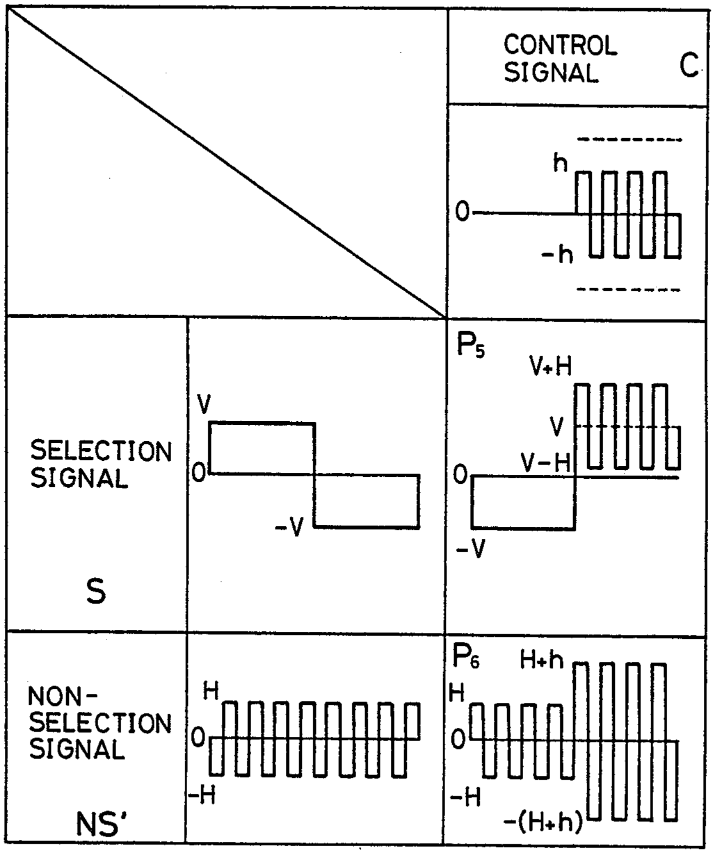

Next, display of intermediate tone is explained. Operations for saturated response condition and saturated reverse response condition are explained above but operations for display of intermediate tone will then be explained hereunder with reference to FIG. 3. In the same figure, the selection signal S is the same as that in FIG. 2 and the voltages $\pm h$ of the control signal C to be supplied to the control electrode groups $R_1 \sim R_5$ are controlled depending on the gradation. In FIG. 3, the liquid crystal is once initialized to the saturated reverse response condition because the DC pulse of $-V$ is applied by the pulse $P_5$ based on the voltage difference between the selection signal S and control signal C, and thereafter the intermediate tone is displayed because of the supply of unsaturated response pulse superposing the high frequency AC pulse of $\pm h$ to the DC pulse V. Namely, the saturated response condition is displayed only with the DC pulse of voltage V but unsaturated response condition can be displayed by controlling the AC stabilizing effect of the high frequency AC pulse. Thereafter, the high frequency AC pulse $P_6$ is applied by the nonselection signal NS' and control signal C in order to hold the response condition. The nonselection signal NS' is changed in the phase by 180° from the nonselection signal NS of FIG. 2 in order to stabilize the AC stabilizing effect during nonselection period.

Figure 4:
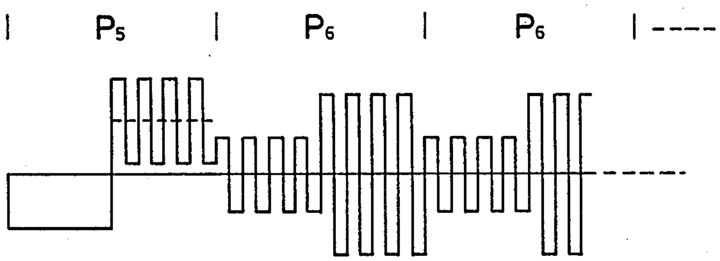
FIG. 4 shows pulse waveforms indicating the pulses to be applied to the pixels by the voltages of FIG. 3.

FIG. 4 shows the pulses, on the time series basis, applied to the pixels by the supply of above signals.

The pulse for display of intermediate tone is not limited only to modulation of voltages $\pm h$ of the control signal and such intermediate tone can be displayed also by the modulation of pulse duration. In either case, it is important to once initialize to the saturated reverse response condition before the pulse for displaying the intermediate tone. If the pulse for display of intermediate tone is only applied, the response condition changes depending on the display condition before application of pulse and thereby stable display of intermediate tone is impossible. However, in an example of FIG. 3, the intermedate tone ca be displayed stably without relation to the preceding response condition in order to initialize the liquid crystal to the saturated reverse response condition before the rewriting of display.

Next, an example of supplying the signal for initializing the display in the timing before supply of the selection signal will be explained hereunder.

Figure 5:
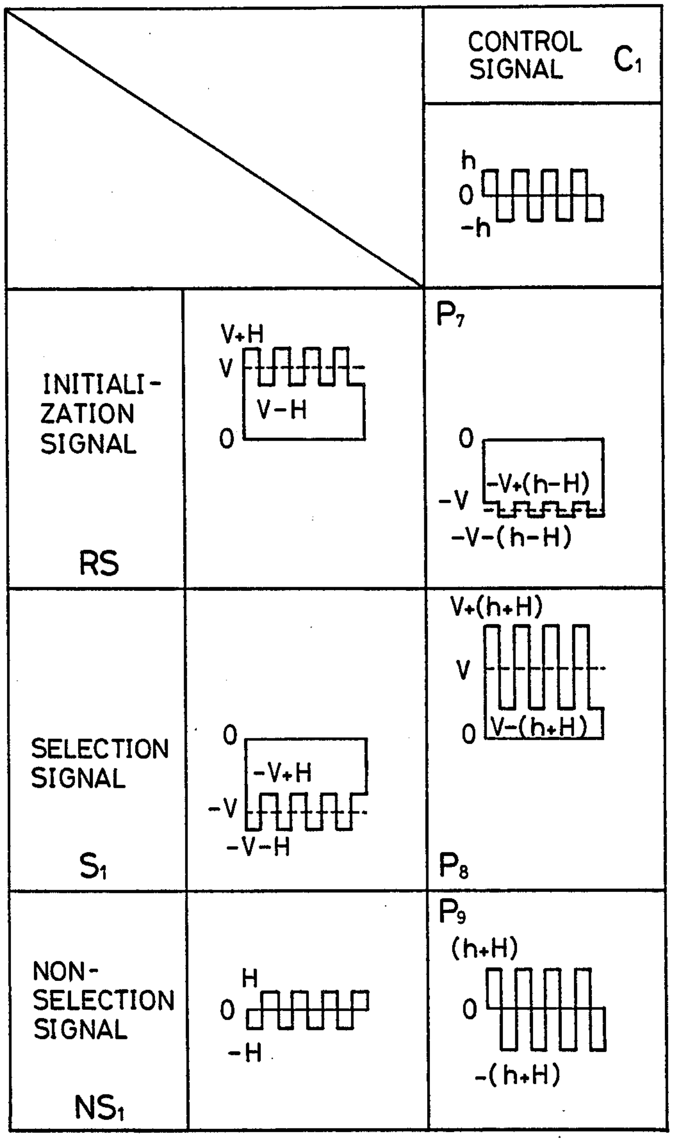
FIG. 5 shows the voltage waveforms indicating the other embodiment of the present invention.

In FIG. 5, the selection signal $S_1$ consisting of voltges $-V \pm H$ is sequentially supplied to the scanning electrodes $L_1$-$L_7$ but the initialization signal RS consisting of voltages $V \pm H$ is supplied in the preceding timing. During the nonselection period, the nonselection signal $NS_1$ of the voltages $\pm H$ is supplied.

Meanwhile, the control signal $C_1$ of voltages $\pm h$ is supplied to the control electrodes $R_1 \sim R_5$ depending on the desired intermediate tone.

Figure 6:
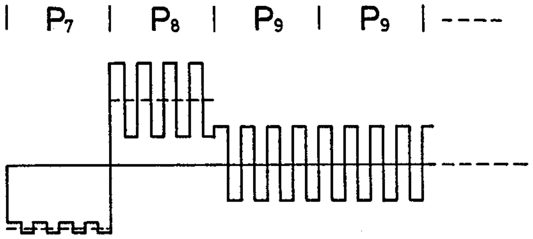
FIG. 6 shows pulse waveforms indicating the pulses to be applied to the pixels by the example of FIG. 5.

Thereby, the pulse group $P_7$ is first applied to the pixels as shown in FIG. 6. The pulse group $P_7$ is formed by superposing the high frequency AC pulse $\pm(h-H)$ to the DC pulse $-V$. After the initialization of display to the saturated reverse response condition by application of the pulse group $P_7$, the intermediate tone is displayed by application of the unsaturated response pulse $P_8$ and thereafter the intermediate tone is held by application of the high frequency pulse $P_9$.

According to this example, since the supply period of signals is reduced to ½ of that in the above example, a number of digits which can be scanned in the same period can be doubled. In other words, the rewriting speed of signal display format can be doubled for the display of the same number of scanning digits.

Next, an example of further curtailing the rewriting period by using a plurality of initialization signals will be explained hereunder.

Figure 7:
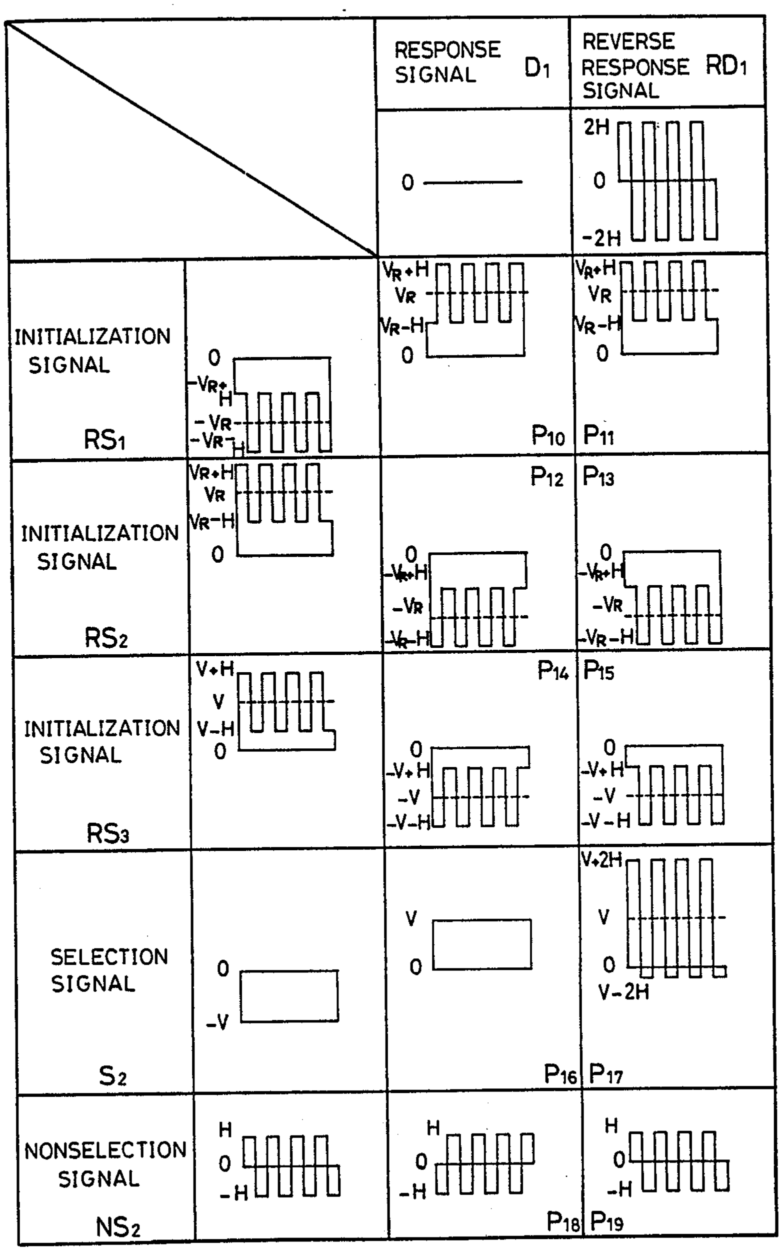
FIG. 7 shows voltage waveforms indicating the other embodiment of the present invention.
Figure 8:
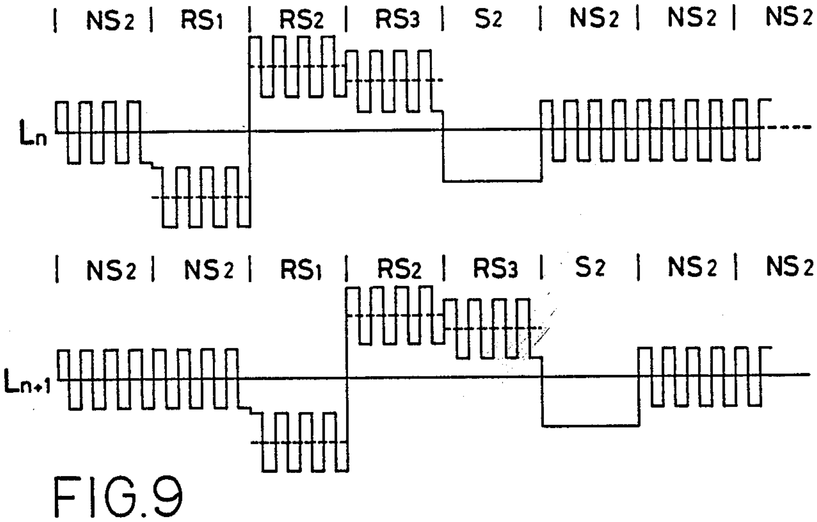
FIG. 8 shows voltage waveforms indicated on the time series basis and supplied to the electrodes by the example of FIG. 7.

In FIG. 7 and FIG. 8, a plurality of initialization signals $RS_1$, $RS_2$, $RS_3$ which sequentially initialize, on the time sharing basis, the scanning electrode group and the selection signal $S_2$ which selects, on the time sharing basis, the scanning electrode group are generated from the selection circuit SE in the timing shown in FIG 8 and the nonselection signal $NS_2$ is generated when such initialization signals and selection signal are not supplied.

The initialization signal $RS_1$ is composed of the voltages $(-VR \pm H)$, while $RS_2$ of voltages $(VR \pm H)$, $RS_3$ of voltages $(V \pm H)$, selection signal $S_2$ of voltage $(-V)$ and nonselection signal $NS_2$ of voltages $(\pm H)$.

Meanwhile, the response signal $D_1$ or reverse response signal $RD_1$ is generated from the drive control circuit DR depending on the desired display condition of pixels on the line to which the selection signal $S_2$ is applied and these signals are supplied to the control electrode group.

With the supply of these signals, the pulse group $P_{10}$ or $P_{11}$ is applied to the response pixels by the supply of the initialization signal RS1. Thereafter, the pulse group $P_{12}$ or $P_{13}$, the pulse group $P_{14}$ or $P_{15}$ are applied to once initialize the pixels to the saturated response condition by the supply of the initialization signals $RS_2$, $RS_3$ and then pulse $P_{16}$ is applied thereto by the selection signal $S_2$ and response signal $D_1$. Since the high frequency AC element is 0 in the pulse $P_{16}$, it does not have the AC stabilizing effect and the pixels are initialized to the saturated response condition by the pulse of voltage V.

The pulse groups $P_{10}$ and $P_{11}$ are formed by superposing the high frequency AC pulse of voltages $\pm H$ to the DC pulse of voltage VR, while the pulse groups $P_{12}$ and $P_{13}$ are formed by superposing the high frequency AC pulse of voltages $\pm H$ to the DC pulse of voltage $-VR$, and the pulse groups $P_{14}$ or $P_{15}$ is formed by superposing the high frequency AC pulse of voltages $\pm H$ to the DC pulse of voltage $-V$, and the pulse $P_{16}$ is a DC pulse of voltage V.

Therefore, respective pulse groups have the DC element but mean voltage level applied to the pixels can be made zero when the pulse group $P_{10}$ or $P_{11}$, pulse group $P_{12}$ or $P_{13}$, pulse group $P_{14}$ or $P_{15}$ and pulse $P_{16}$ *L are applied. Namely, the area of voltage waveform in the positive side becomes*

*equal to the area of voltage waveform in the negative side. After application of the pulse $P_{16}$*, the high frequency AC pulse group $P_{18}$ or $P_{19}$ is applied by the nonselection signal $NS_2$ and the response condition can be stably held by the AC stabilizing effect.

On the other hand, after application of the pulse group $P_{10}$ or $P_{11}$, the pulse group $P_{12}$ or $P_{13}$ and pulse group $P_{14}$ or $P_{15}$ are applied to the reverse response pixels to once initialize them to the saturated reverse response condition and thereafter the pulse group $P_{17}$ is applied thereto by the selection signal $S_2$ and reverse response signal $RD_1$. Since the pulse group $P_{17}$ is formed by superposing the high voltage high frequency AC pulse of voltages $\pm 2H$ to the DC pulse of voltage V, the pixels are not initialized to the saturated response condition by the AC stabilizing effect of $\pm 2H$ and are held in the saturated reverse response condition. In this case, the pulse group $P_{10}$ or $P_{11}$, pulse group $P_{12}$ or $P_{13}$, pulse group $P_{14}$ or $P_{15}$ and the pulse group $P_{17}$ are applied and the mean voltage level applied to the pixels becomes 0. Moreover, after application of pulse group $P_{17}$, the high frequency AC pulse $P_{18}$ or $P_{19}$ is applied and the pixels are held in the reverse response condition by the AC stabilizing effect.

Figure 9:
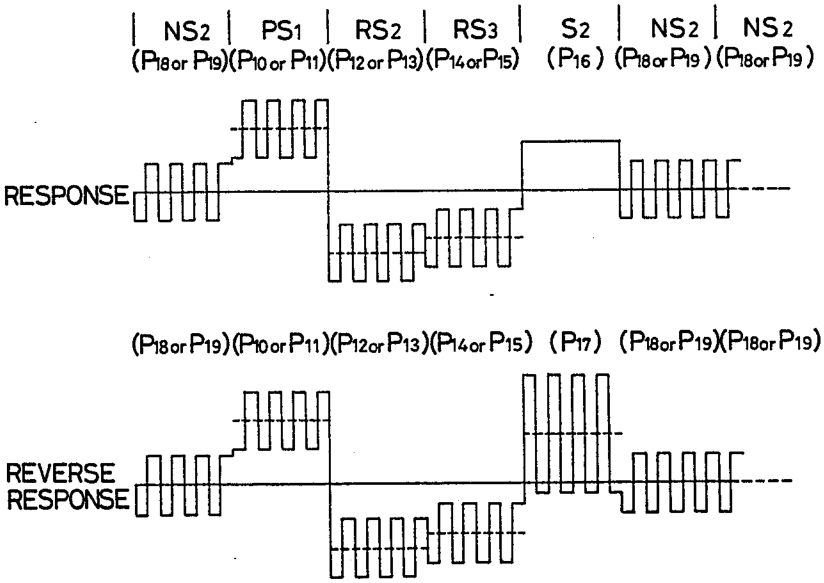
FIG. 9 shows pulse waveforms indicating the pulses to be applied to the pixels by example of FIG. 7.

FIG. 9 shows an example of waveforms applied to the response and reverse response pixels. As explained and shown above, introduction of the initialization signals realizes initialization of the next line simultaneously with supply of the selection signal and scanning of the one line with the DC pulse width. Thereby, the rewritting period of display can be shortened. Moreover a plurality of initialization signal makes perfect the initialization of pixels to the saturated reverse response condition. Thereby, the driving margin becomes large and stable driving can be realized even if cell thickness is fluctuated.

In the above explanation, the pixels are initialized to the saturated response condition and saturated reverse response condition in order to explain the driving principle, and then operations for display of intermediate tone are explained hereunder.

Figure 10:
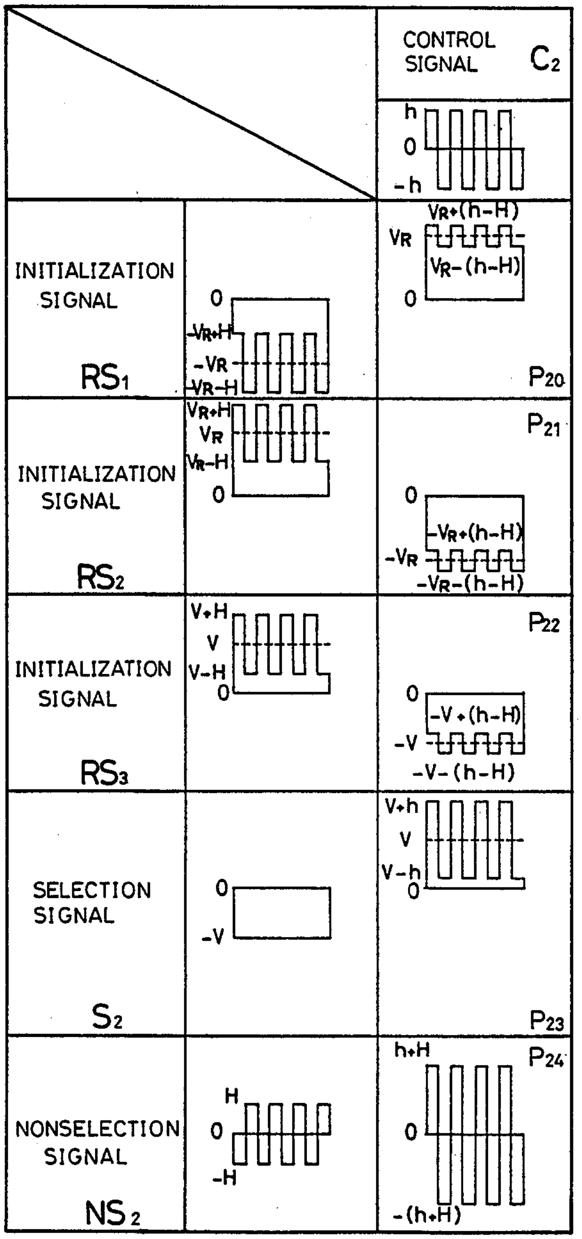
FIG. 10 and FIG. 11 show voltage waveforms respectively indicating the other embodiment of the present invention.

In FIG. 10, the initialization signals $RS_1$, $RS_2$, $RS_3$ and selection signal $S_2$ are same as those used in FIG. 7 and the voltage $\pm h$ of control signal C supplied to the control electrode is controlled depending on the color tone.

In FIG. 10, after application of the pulse group $P_{20}$ by the supply of the initialization signal $RS_1$ and control signal $C_2$, the pulse groups $P_{21}$, $P_{22}$ are applied subsequently to the pixels by the supply of initialization signals $RS_2$, $RS_3$ and control signal $C_2$ and thereby pixels are initialized to the saturated reverse response condition and thereafter the pulse $P_{23}$ is applied by the supply of selection signal $S_2$. The pulse group $P_{23}$ is formed by superposing the high frequency AC pulse of voltages $\pm h$ to the DC pulse of voltage V and unsaturated response condition (intermediate tone) can be displayed by applying this pulse.

Namely, the display is initialized to the saturated response condition only when the pulse of voltage V but unsaturated response condition can be obtained by controlling the AC stabilizing effect of the high frequency AC pulse superposed to such voltage V.

Thereafter, the high frequency AC pulse $P_{24}$ is applied by the nonselection signal $NS_2$ and control signal $C_2$ such response condition can be held. The nonselection signal $NS_2$ is changed in the phase from the nonselection signal $NS_2$ of FIG. 7 in order to stabilize the AC stabilizing effect during the nonselection period.

As the pulse for displaying the intermediate tone, not only the voltages $\pm h$ of control signal is modulated but also the pulse duration can be modulted.

Figure 11:
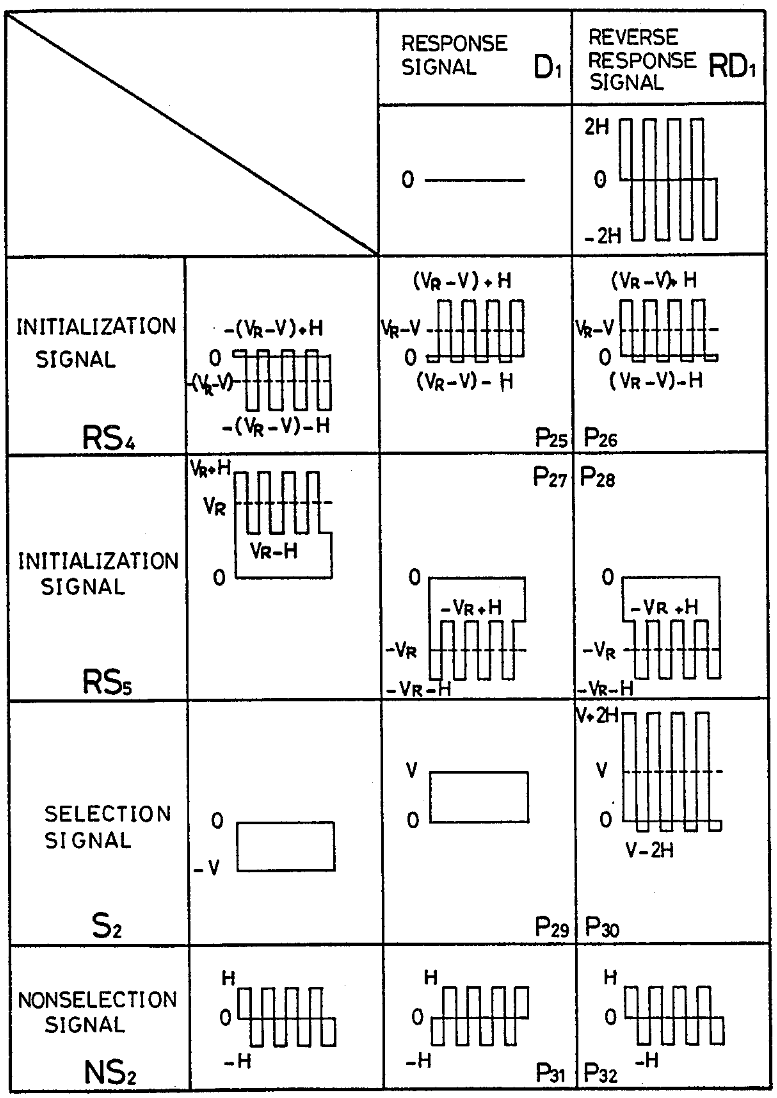

FIG. 11 shows examples of the other signal waveforms. These signals realize the driving similar to that of FIG. 7 but the number of initialization signals is reduced. Namely, this example initializes to the saturated reverse response condition only with the initialization signal $RS_5$.

Unbalance of voltage applied to the pixels by the supply of initialization signal $RS_5$ and selection signal $S_2$ is adjusted by the initialization signal $RS_4$ and thereby a mean voltage level applied to the pixels is to 0. The selection signal $S_2$, nonselection signal $NS_2$, response signal $D_1$ and reverse response signal $RD_1$ are the same as those used in FIG. 7.

In the case of this example, the intermediate tone can also be displayed by supplying the control signal $C_2$ of FIG. 10 in place of the response signal $D_1$ and reverse response signal $RD_1$ and then controlling the voltage or duty thereof.

In the above explanation, the term "response" is used for the positive voltage and "reverse response" for the negative voltage but since response and reverse response are correlative, the reverse response may be used for positive voltage and the response for the negative voltage.

The signals supplied to the electrodes are not limited only to those explained above and allow various modifications, and moreover it is also allowed to apply an adequate bias voltage as required.

Furthermore, the embodiment mentioned above refers to the matrix type display indicated in FIG. 1 but it is not limited only to such matrix type display and the present invention can naturally be adopted to the driving of the liquid crystal shutter array for an optical printer where the optical shutter array arranged in the form of a line is divided for each of the plural blocks and these are wired like a matrix. In this case, high contrast can be realized by setting the reverse response condition to the dark condition of display.

[EFFECT OF THE INVENTION]

The present invention is capable of realizing display of intermediate tone by controlling the high frequency AC pulse and assures stable display of intermediate tone by once initializing the display to the saturated reverse response condition before the pulse for displaying the intermediate tone. Moreover, since a mean voltage level of the pulse group applied to the pixels is 0, blackening of transparent electrodes, discoloration of dichroism pigment and deterioration of liquid crystal are no longer eliminated even after the driving for a long period of time. Moreover, the method for supplying the initialization signal before the supply of selection signal initializes the next line simultaneously with the supply of the selection signal and moreover scans the one line with the DC pulse width. Thereby, the period required for rewriting of display can be shortened and large effect can be obtained in the field of picture display. In other words, a number of scanning digits in the same period can be increased and high precision display can also be realized. In addition, the perfect initialization to the saturated reverse response condition can be realized by using a plurality of initialization signals. Therefore, large driving margin can be assured and stable driving can also be realized even if cell thickness fluctuates.

What is claimed:

1. A method for driving a liquid crystal optical apparatus, forming pixels in the form of a matrix by providing the ferroelectric liquid crystal having AC stabilizing effect between a scanning electrode group and a control electrode group, wherein a first pulse is applied to the pixels in order to initialize the ferroelectric liquid crystal to a saturated reverse condition depending on the voltage difference between the signal supplied to the scanning electrode group and the signal supplied to the control electrode, a second pulse is applied to initialize the ferroelectric liquid crystal to a saturated response condition or a third pulse where a high frequency AC pulse is superposed to the second pulse, is thereafter applied to initialize the liquid crystal to the desired response condition including intermediate tone, an AC pulse group is then applied to hold the desired response condition, a mean voltage level of the first and second pulses and a mean voltage level of the first and third pulses are 0, and a high frequency AC pulse superposed to the second pulse is controlled depending on the display tone.

2. A liquid crystal optical apparatus according to claim 1, where the second pulse is the same in the waveform as the first pulse but different only in the polarity.

3. A method for driving a liquid crystal display apparatus according to claim 2, where the ferroelectric liquid crystal shows negative dielectric anisotropy in the frequency range of high frequency AC pulse.

4. A method for driving a liquid crystal display apparatus according to claim 1, where the ferroelectric liquid crystal shows negative dielectric anisotropy in the frequency range of high frequency AC pulse.

5. A method for driving liquid crystal optical apparatus, comprising pixels providing ferroelectric liquid crystal having AC stabilizing effect between two electrodes, where;

a pulse including the DC pulse element for initializing the pixels to a saturated reverse response condition, a pulse superposing a high frequency AC pulse to the DC pulse of reverse polarity which is symmetrical to the DC pulse element in order to initialize the ferroelectric liquid crystal to a desired response condition including intermediate tone, and a high frequency AC pulse to hold the desired response condition are sequentially applied to the pixels and said high frequency AC pulse superposed to the DC element is controlled depending on the display tone.

6. A method for driving a liquid crystal optical apparatus according to claim 4, where the ferroelectric liquid crystal shows negative dielectric anisotropy in the frequency range of high frequency AC pulse.

7. A method for driving a liquid crystal optical apparatus, forming matrix-type pixels by providing ferroelectric liquid crystal having AC stabilizing effect between a scanning electrode group and a control electrode group, where initialization signals are sequentially supplied to the scanning electrode group, a selection signal is supplied thereto following the initialization signals and a nonselection signal is supplied when the initialization signals and selection signal are not supplied, a desired signal is supplied to the control electrode group, after the ferroelectric liquid crystal is initialized to a saturated reverse response condition depending on the voltage difference between the desired signal and initialization signals, a pulse superposing a high frequency AC pulse to the DC pulse is applied in order to initialize the ferroelectric liquid crystal to the desired response condition depending on the voltage difference between the desired signal and selection signal, an AC pulse which holds the desired response condition of the ferroelectric liquid crystal is applied depending on the voltage difference between the desired signal and nonselection signal, a mean voltage level applied to the ferroelectric liquid crystal is 0, and said high frequency AC pulse superposed to the DC pulse is controlled depending on the display tone.

8. A method for driving a liquid crystal optical apparatus according to claim 7, where the ferroelectric liquid crystal shows negative dielectric anisotropy in the frequency range of high frequency AC pulse.

* * * * *